United States Patent
Hayashi et al.

(10) Patent No.: US 7,987,049 B2
(45) Date of Patent: Jul. 26, 2011

(54) GPS-BASED ATTITUDE DETERMINATION SYSTEM WITH SELF-DIAGNOSIS FUNCTION

(75) Inventors: Koji Hayashi, Nishinomiya (JP); Sadao Sato, Nishinomiya (JP); Masaru Fukuda, Nishinomiya (JP)

(73) Assignee: Furuno Electric Company, Ltd., Nishinomiya (JP)

(*) Notice: Subject to any disclaimer, the term of this patent is extended or adjusted under 35 U.S.C. 154(b) by 540 days.

(21) Appl. No.: 12/220,576

(22) Filed: Jul. 25, 2008

(65) Prior Publication Data

US 2009/0030612 A1    Jan. 29, 2009

(30) Foreign Application Priority Data

Jul. 25, 2007  (JP) ................. 2007-193350

(51) Int. Cl.
*G01C 21/00*    (2006.01)
(52) U.S. Cl. ...................................................... 701/213
(58) Field of Classification Search .................. 701/207, 701/213, 214, 215, 216, 220
See application file for complete search history.

(56) References Cited

U.S. PATENT DOCUMENTS

| | | | |
|---|---|---|---|
| 6,266,582 B1 | 7/2001 | Bruckner | |
| 6,408,245 B1 | 6/2002 | An et al. | |
| 6,424,915 B1* | 7/2002 | Fukuda et al. | 701/214 |
| 6,496,778 B1 | 12/2002 | Lin | |
| 7,409,290 B2* | 8/2008 | Lin | 701/214 |
| 2002/0120400 A1 | 8/2002 | Lin | |

FOREIGN PATENT DOCUMENTS

| JP | 9-297171 | 11/1997 |
|---|---|---|
| JP | 2000-269722 | 9/2000 |
| JP | 2001-280997 | 10/2001 |
| JP | 2004-239643 | 8/2004 |

OTHER PUBLICATIONS

International Search Report (issued Oct. 31, 2008).

* cited by examiner

*Primary Examiner* — Kim T Nguyen
(74) *Attorney, Agent, or Firm* — Nutter McClennan & Fish LLP; John J. Penny, Jr.

(57) ABSTRACT

A GPS-Based ADS for determining attitude and heading of a moving body comprises a GPS receiver, an inertial sensor unit, a blockage area calculator, a sensor anomaly detector and a monitor. The GPS-Based ADS provides information useful for making a judgment on appropriateness of installation sites and mounting conditions of a GPS antenna and inertial sensors based on blockage area information concerning each satellite signal blockage area obtained by the blockage area calculator and sensor signal anomaly information concerning each inertial sensor anomaly obtained by the sensor anomaly detector.

23 Claims, 5 Drawing Sheets

GPS-BASED ATTITUDE DETERMINATION SYSTEM WITH SELF-DIAGNOSIS FUNCTION

BACKGROUND OF THE INVENTION

1. Field of the Invention

The present invention relates generally to a GPS-Based attitude determination system(GPS-Based ADS) for determining attitude and heading(or azimuth) of a moving body, such as a vessel, by combined use of the Global Positioning System (GPS) and an inertial navigation system (INS) including inertial sensors. More particularly, the invention pertains to a technique used in a GPS-Based ADS for monitoring occurrences of operational failures of the system and diagnosing the cause of each operational failure.

2. Description of the Related Art

Typically, a conventionally known GPS-Based ADS configured to determine position, velocity, attitude and heading (or azimuth) of a moving body by using a plurality of GPS antennas includes multiple inertial sensors and a GPS receiver which outputs the position, velocity, attitude and heading of the moving body. The GPS-Based ADS thus configured can provide highly accurate and robust information on the position, velocity, attitude and heading of the moving body by integrating outputs of the GPS receiver and the inertial sensors. While the GPS-Based ADS is often provided with a plurality of GPS antennas, this is not absolutely required. As an alternative, the GPS-Based ADS may employ a single GPS antenna configuration, although the GPS-Based ADS so configured can not obtain attitude information from the GPS receiver. To cope with this problem, the GPS-Based ADS having the single GPS antenna configuration may be configured to calculate the attitude of the moving body from acceleration data output from accelerometers or to obtain attitude information from magnetic sensors. The single GPS antenna configuration has one drawback, however, in that the GPS-Based ADS can not provide full attitude of the moving body including roll, pitch and heading thereof. Nevertheless, there is a general tendency today to integrally incorporate a GPS receiver module, inertial sensors and an integration filter of the GPS-Based ADS in a radome-like housing to achieve compact design and low cost.

In the aforementioned kind of GPS-Based ADS employing a single-structured sensor portion including the GPS receiver module, the inertial sensors and the integration filter built in the radome-like housing, it is essential that the sensor portion be installed at a location where multipath disturbance or blockage of satellite signals would not occur and the sensor portion would not be subjected to severe vibrations or impact. Practically, however, it might not be possible to install the sensor portion at such an appropriate location. Additionally, it is impossible to make sure that the sensor portion is mounted at an appropriate installation site under appropriate conditions, because it is difficult to make an on-site judgment as to whether the selected installation site and mounting conditions are appropriate.

If the installation site or mounting conditions of the sensor portion are inappropriate, the GPS-Based ADS would produce an operational problem. It is, however, extremely difficult for a user (or an installer) to judge whether the problem is caused by the inappropriate installation site or mounting conditions or by a failure of the GPS-Based ADS itself. Accordingly, the user (installer) would have to devote considerable time and labor to the solution of this kind of problem. The conventional GPS-Based ADS provides only such information as the number of GPS satellites from which GPS signals are currently tracked, positions of the GPS satellites and dilution of precision (DOP) indicating GPS satellite geometry, and not any information useful for making a judgment on appropriateness of the installation site and mounting conditions of the sensor portion.

The prior art discloses some approaches directed to the solution of the aforementioned problem of the conventional GPS-Based ADS.

For example, Japanese Patent Application Publication No. 2000-269722 proposes a technique for detecting GPS signal blockage by an obstacle and warning a user of the occurrence of such blockage by audible or visible means based on a difference in the levels of signals received by a plurality of antennas. This technique requires multiple antennas for detecting signal blockage, wherein the number of the antennas must be more than two. In a configuration with only two antennas, GPS signal blockage on both antennas will occur if the two antennas and an obstacle are located in line. Thus, the technique of comparing received signal levels can not be applied to a two-antenna configuration. In addition, the technique of the Publication does not provide any information which can be used for making a judgment on appropriateness of an antenna installation site and mounting conditions.

Another example of the prior art is found in Japanese Patent Application Publication No. 1997-297171, which describes a technique for determining whether an antenna of a GPS receiver is located outdoors or indoors. According to the Publication, a judgment is made to determine whether the antenna of the GPS receiver is located outdoors or indoors based on the number of GPS satellites used for navigation solution, comparative levels of received satellite signals, appropriateness of satellite elevation angles and signal tracking conditions. The technique of this Publication is intended to determine whether an object being monitored (i.e., the GPS antenna) is located outdoors or indoors by use of a signal blockage phenomenon, and not to identify causes of a system failure related to the antenna installation site and/or mounting conditions.

SUMMARY OF THE INVENTION

The present invention is intended to solve the aforementioned problem of the prior art. Accordingly, it is an object of the invention to provide a technique applicable to a GPS-Based ADS which makes it possible to determine whether a system failure, if any, is caused by blockage of satellite signals by an obstacle due to an improper installation site or a total loss or abnormal reception of satellite signals due to improper mounting conditions and resultant vibrations and impact. It is a more specific object of the invention to provide a GPS-Based ADS which can diagnose the cause of an operational failure thereof, if any, and provide information concerning whether an abnormal output of the system is caused by 1) blockage of satellite signals by an obstacle due to an improper installation site, 2) inability to correctly receive signals due to an improper installation site or mounting conditions and resultant vibrations or impact, or 3) abnormal output signals of inertial sensors due to a failure thereof. The Conception of judgment the cause of an operational failure is Showing following table1:

TABLE 1

| | | Judgment on GPS signal blockage areas | |
|---|---|---|---|
| | | GPS signal reception successful | GPS signal reception unsuccessful |
| Judgment on inertial sensor anomalies | Normal | No problem in installation sites and mounting conditions | Inappropriate installation sites |
| | Abnormal | Inappropriate mounting conditions | Inappropriate installation sites and mounting conditions |

According to the invention, a GPS-Based ADS for determining attitude and heading (referenced to north) of a moving body comprises a GPS receiver, an inertial sensor unit, a blockage area calculator, a sensor anomaly detector and a monitor. The blockage area calculator defines a GPS signal blockage area in which GPS signals are lost in a sightline direction of each blocked GPS satellite. The sensor anomaly detector detects an anomaly of an inertial sensor signal fed from the inertial sensor unit. The blockage area calculator and the sensor anomaly detector generate blockage area information and sensor signal anomaly information, respectively, which are supplied to the monitor.

The monitor presents information to be used for identifying a cause of a failure of the GPS-Based ADS based on the blockage area information and the sensor signal anomaly information obtained from the blockage area calculator and the sensor anomaly detector, respectively. The information presented on the monitor enables a user (or an installer) to judge whether the system failure is caused by blockage of the satellite signals by an obstacle, inability to correctly receive the satellite signals due to vibrations or impact, or an abnormal output signal from the inertial sensor unit, for example.

If the information presented on the monitor indicates that the system failure is caused by GPS signal blockage, it would be easy for the user (installer) to identify an obstacle causing the GPS signal blockage and decide whether it is necessary to mount a GPS antenna at a different installation site. Also, if the information presented on the monitor indicates that there is neither GPS signal blockage nor a sensor signal anomaly, the user (installer) can judge that the system failure is attributed to some other cause than an improper installation site or mounting conditions.

In one aspect of the invention, the aforementioned blockage area information may include at least such pieces of information as the identification number and direction of each blocked GPS satellite or the number of occurrences of GPS signal blockage in that direction in addition to the location of the blockage area. Also, the aforementioned sensor signal anomaly information may include at least such pieces of information as the identification number of each inertial sensor of which output signal is abnormal or the number of occurrences of anomalies of each inertial sensor in addition to information just indicating the occurrences of the inertial sensor anomalies. Moreover, either of the blockage area information and the sensor signal anomaly information may include additional pieces of information, such as date and time of the occurrence of each signal anomaly (blockage), elevation angle of each blocked GPS satellite, position, velocity, turn rate and heading of the moving body.

In another aspect of the invention, the blockage area calculator converts the direction of a GPS satellite of which GPS signal is blocked in a local geodetic frame or the Earth-center-Earth-fixed (ECEF) frame into a direction projected onto a horizontal plane of a body frame referenced to the moving body and defines the GPS signal blockage area based on the direction of the blocked GPS satellite in the body frame. As the blockage area calculator defines the GPS signal blockage area based on the direction of the blocked GPS satellite converted into the body frame, it is possible to easily identify an obstacle on the moving body that causes the GPS signal blockage.

In another aspect of the invention, the blockage area calculator counts the number of occurrences of the GPS signal blockage in a particular area and generates the blockage area information concerning the GPS signal blockage area when the counted number of occurrences of the GPS signal blockage in that area exceeds a predetermined threshold value.

In another aspect of the invention, the blockage area calculator generates the blockage area information only when the number of currently tracked GPS signals is smaller than a minimum number of GPS satellites required for navigation solution.

In another aspect of the invention, the sensor anomaly detector generates the sensor signal anomaly information when any inertial sensor signal anomaly occurs. Alternatively, the sensor anomaly detector generates the sensor signal anomaly information when the number of occurrences of signal anomalies of a particular inertial sensor exceeds a predetermined threshold value. Still alternatively, the sensor anomaly detector may generate the sensor signal anomaly information depending on at least one of such conditions as the number of GPS satellites used for navigation solution, the velocity of the moving body and the turn rate thereof.

In another aspect of the invention, the blockage area calculator outputs the blockage area information to be presented by the monitor each time blockage of a GPS signal occurs, or the sensor anomaly detector outputs the sensor signal anomaly information to be presented by the monitor each time an anomaly of an inertial sensor signal occurs. Also, the blockage area calculator and the sensor anomaly detector, or the monitor, may store the blockage area information and the sensor signal anomaly information for a specific period of time in the past and output these pieces of information on request for presentation on the monitor. By storing the blockage area information and the sensor signal anomaly information for a specific period of time in the past, it becomes possible to make a judgment on the cause of a system failure based on a statistical analysis of a record of GPS signal blockages or sensor signal anomalies that occurred in the past.

In another aspect of the invention, the monitor generates and presents the blockage area information and/or the sensor signal anomaly information in the form of a voice message, a graphic or tabular representation, a text message, or a combination thereof. The information thus presented by the monitor permits the user (installer) to make a judgment on appropriateness of installation sites and mounting conditions of the GPS receiver and the inertial sensor unit.

In still another aspect of the invention, when a plurality of GPS signal blockage areas exist, the monitor presents information on only one of the GPS signal blockage areas in which GPS signal blockage has most often occurred or information on all of the GPS signal blockage areas in which GPS signal blockage has occurred.

In yet another aspect of the invention, the GPS-Based ADS comprises a plurality of inertial sensors, wherein the monitor presents information on only one of the inertial sensors which has most often produced sensor signal anomalies or on all of the inertial sensors which have produced sensor signal anomalies.

The GPS-Based ADS of the invention detects occurrences of individual GPS signal blockages and inertial sensor signal anomalies and separately produces the blockage area information and the sensor signal anomaly information. This approach of the invention makes it possible to identify a cause of a failure of the GPS-Based ADS. Since the blockage area calculator defines a GPS signal blockage area by converting the direction of each blocked GPS satellite expressed in the local geodetic frame or ECEF frame into a direction in the body frame referenced to the moving body, the user (installer) can easily identify an obstacle existing in the GPS signal blockage area.

These and other objects, features and advantages of the invention will become more apparent upon a reading of the following detailed description in conjunction with the accompanying drawings.

DETAILED DESCRIPTION OF THE PREFERRED EMBODIMENT OF THE INVENTION

Figure 1:
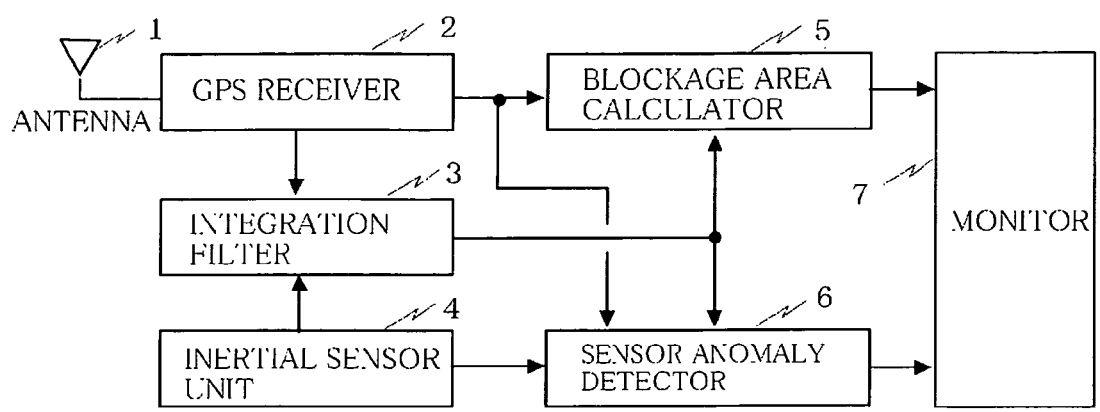
FIG. 1 is a functional configuration diagram of a GPS-Based ADS according to a preferred embodiment of the invention.

FIG. 1 is a functional configuration diagram of a GPS-Based ADS according to a preferred embodiment of the invention. As shown in FIG. 1, the GPS-Based ADS includes an antenna unit 1, a GPS receiver 2, an integration filter 3, an inertial sensor unit 4, a blockage area calculator 5, a sensor anomaly detector 6 and a monitor 7.

The GPS receiver 2 tracks GPS signals received through the antenna unit 1, calculates attitude information including position, velocity and heading of a moving body (e.g., a vessel) by a method of the prior art, and delivers the calculated information (hereinafter referred to as GPS data) to the integration filter 3, the blockage area calculator 5 and the sensor anomaly detector 6. If the GPS receiver 2 is of a multi-antenna configuration with the antenna unit 1 including a plurality of GPS antennas, it is possible to obtain information on the heading of the moving body from an output of the GPS receiver 2. In a case where the GPS receiver 2 is of a single-antenna configuration with the antenna unit 1 including a single GPS antenna, on the other hand, the integration filter 3 can provide information on the heading of the moving body referenced to true north if the inertial sensor unit 4 is provided with a three-axis accelerometer including three acceleration sensors. If the GPS-Based ADS is provided with such an auxiliary sensor as a magnetic sensor or a heading sensor which provides information on the heading of the moving body, the accelerometer is not necessarily required.

The inertial sensor unit 4 of the embodiment includes a three-axis accelerometer and a three-axis angular velocity sensing device which output three-axis acceleration signals and angular velocity signals, respectively, to the integration filter 3 and the sensor anomaly detector 6. It is to be pointed out that the GPS-Based ADS of the embodiment need not necessarily be provided with a combination of the three-axis accelerometer and the three-axis angular velocity sensing device but may be configured with at least a plurality of gyro sensors alone.

The integration filter 3 estimates and makes up for various errors in the GPS data and inertial sensor errors from inertial sensor signals received from the inertial sensor unit 4 and the GPS data received from the GPS receiver 2 by using a conventionally known method, and estimates the position, velocity, attitude and heading of the moving body with high accuracy. The integration filter 3 outputs the position, velocity, attitude and heading of the moving body to the blockage area calculator 5 and the sensor anomaly detector 6.

When any blockage of a GPS signal is detected from GPS satellite tracking information received from the GPS receiver 2, the blockage area calculator 5 calculates the direction of a GPS satellite expressed in terms of heading and elevation angle thereof in a local geodetic frame or the ECEF frame from the position of the GPS satellite and the position of the moving body obtained immediately before the occurrence of the GPS signal blockage. Then, the blockage area calculator 5 converts the direction of the GPS satellite in the local geodetic frame or the ECEF frame into a direction in a body frame (i.e., a coordinate system referenced to the moving body) and defines a GPS signal blockage area based on the direction of the blocked GPS satellite in the body frame. In one variation of the embodiment, the GPS-Based ADS may be configured such that the blockage area calculator 5 obtains the direction of the blocked GPS satellite in the local geodetic frame or the ECEF frame directly from the GPS receiver 2.

The aforementioned blockage area of which direction is converted into the direction of the blocked GPS satellite in the body frame may be defined as an area having a predetermined sector angle oriented in the direction of the blocked GPS satellite in the local geodetic frame or the ECEF frame projected onto an x-y plane of the body frame. Alternatively, the blockage area of which direction is converted into the direction referenced to the body frame may be defined as a three-dimensional zone having a predetermined solid angle oriented in the direction of the blocked GPS satellite. In this case, the blockage area in which the signal from the GPS satellite is blocked is defined three-dimensionally, so that it is possible to identify an obstacle causing the GPS signal blockage more easily.

The blockage area calculator 5 generates information on each blockage area and delivers this information to the monitor 7 for on-screen presentation of blockage area information. The blockage area information may include such pieces of information as identification numbers and positions of individual GPS satellites of which signals are blocked as well as the number of the blocked GPS satellites. The blockage area information is used for judging appropriateness of an installation site of the antenna unit 1.

Figure 2:
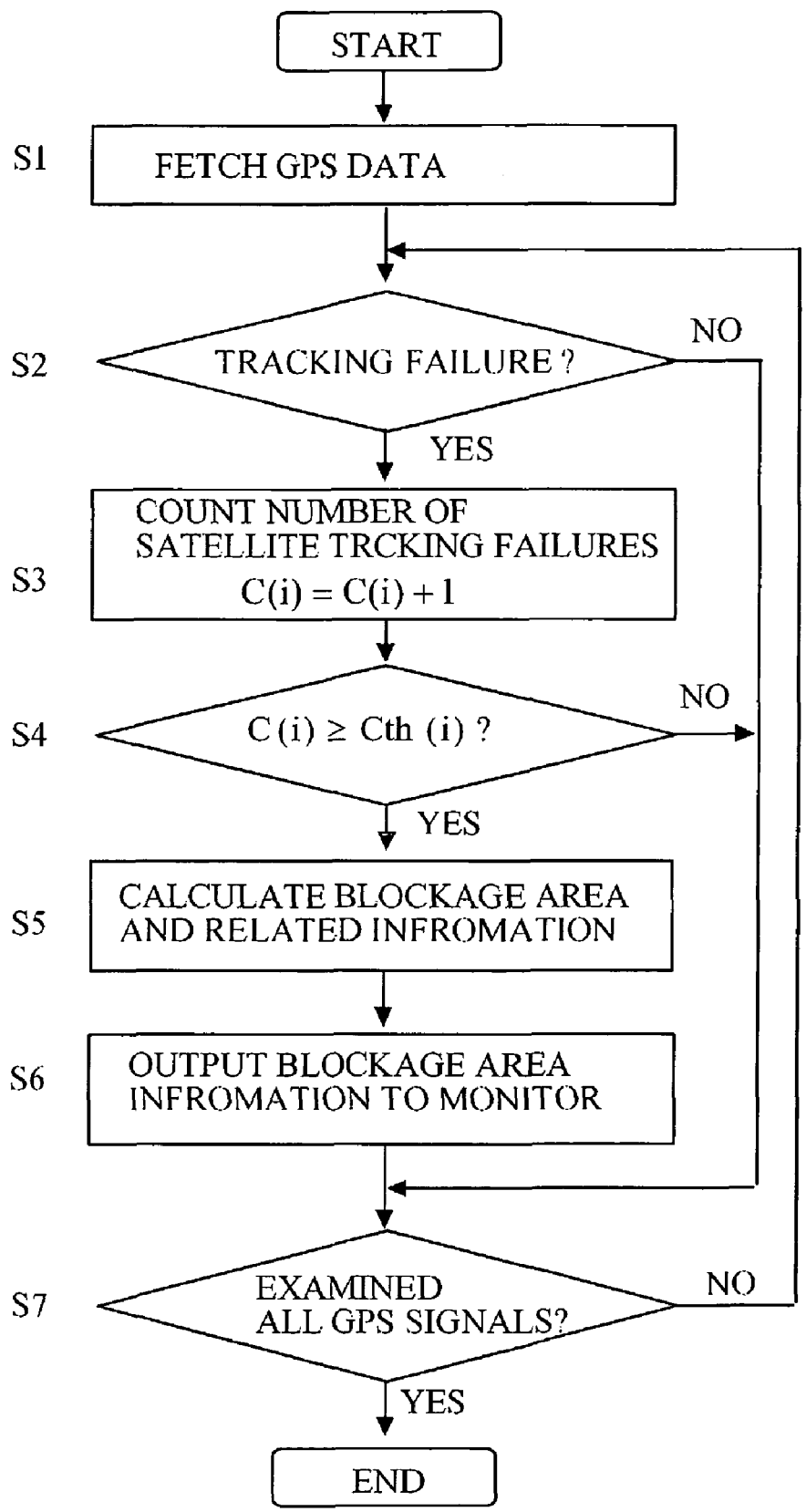
FIG. 2 is a flowchart showing a sequence of processing steps carried out by a blockage area calculator of the embodiment of the invention.

FIG. 2 is a flowchart showing a sequence of processing steps carried out by the blockage area calculator 5 of the present embodiment of the invention.

First, the blockage area calculator 5 fetches such data as the number of GPS satellites being tracked, the positions of the tracked GPS satellites, the GPS satellite tracking information as well as the position and heading of the moving body from the GPS receiver 2 in step S1.

Next, the blockage area calculator 5 examines tracking conditions of one of the GPS satellites being tracked with reference to the GPS satellite tracking information to determine whether the GPS satellite is properly tracked in step S2. If it is impossible to update the previously obtained data on an ith GPS satellite in a current data fetch cycle due to GPS signal blockage (Yes in step S2), the blockage area calculator 5 proceeds to step S3. The blockage area calculator 5 otherwise proceeds to step S6 (No in step S2). Although not illustrated, the sequence of FIG. 2 may be modified such that the blockage area calculator 5 proceeds to step S5 without going through steps S3 and S4 when any GPS signal blockage is detected.

Proceeding to step S3 in the event of blockage of the ith GPS satellite, the blockage area calculator 5 counts the number of occurrences of GPS signal blockage (satellite tracking failures) by using a blockage counter. In one form of the embodiment, the blockage counter may be controlled to increment a count value C(i) of the number of occurrences of GPS signal blockage only when the number of currently tracked GPS signals is smaller than a minimum number of GPS satellites required for navigation solution. Also, the blockage area calculator 5 may skip steps S3 and S4 and proceed to step S5 blockage when GPS signal blockage occurs.

Proceeding now to step S4, the blockage area calculator 5 compares the count value C(i) of the blockage counter with a predetermined threshold value Cth(i). If C(i)≧Cth(i) (Yes in step S4), the blockage area calculator 5 proceeds to step S5. The blockage area calculator 5 otherwise proceeds to step S7 to see whether examination of tracking conditions of all the tracked GPS satellites has been completed.

Proceeding to step S5, the blockage area calculator 5 determines a blockage area of the GPS satellite of which blockage was detected in step S2 as part of blockage area information concerning the blocked GPS satellite. In step S5, the blockage area calculator 5 acquires, or generates, at least such pieces of information as the identification number and direction (heading and elevation angle) of the blocked GPS satellite and the number of occurrences of GPS signal blockage in that direction in addition to the location of the blockage area and, then, the blockage area calculator 5 stores the blockage area information including all these pieces of information concerning the GPS signal blockage area. Then, in step S6, the blockage area calculator 5 outputs the blockage area information including the aforementioned pieces of information to the monitor 7 for on-screen presentation. In succeeding step S7, the blockage area calculator 5 makes a check to see whether the tracking conditions of all the tracked GPS satellites have been examined. Should there exist any other tracked GPS satellite of which tracking conditions have not been examined yet, the blockage area calculator 5 returns to step S2 and repeats the above-described steps S2 to S7 until examination of the tracking conditions of all the tracked GPS satellites is completed.

Now, the working of the sensor anomaly detector 6 is described. The sensor anomaly detector 6 detects anomalies of inertial sensor signals obtained from the inertial sensor unit 4 by comparing each inertial sensor signal with a predetermined threshold value.

In a case where the inertial sensor unit 4 employs one or more acceleration sensors, a threshold value used for detecting an anomaly of each acceleration sensor signal (hereinafter referred to as the acceleration sensor threshold value) may be determined based on changes in the acceleration sensor signal obtained before and after a data update cycle, for example. In this case, the acceleration sensor signal before the data update cycle may be defined as a mean value thereof during a predetermined previous data update period or as an acceleration sensor signal obtained in an immediately preceding data update cycle.

Alternatively, focusing on the fact that the occurrence of an anomaly of an acceleration sensor signal is related to the velocity of the moving body, the acceleration sensor threshold value may be defined as a value obtained by multiplying the moving body's velocity obtained from the GPS receiver 2 or the integration filter 3 by a specific coefficient. Still alternatively, the acceleration sensor threshold value may be defined based on acceleration of the moving body calculated from the rate of change in the moving body's velocity obtained from the GPS receiver 2 or the integration filter 3. The acceleration sensor threshold value defined by one of the aforementioned methods may be adjusted according to the velocity or turn rate of the moving body.

In a case where the inertial sensor unit 4 employs one or more gyro sensors, a threshold value used for detecting an anomaly of each gyro sensor signal (hereinafter referred to as the gyro sensor threshold value) may be determined based on changes in the gyro sensor signal obtained before and after a data update cycle, for example. In this case, the gyro sensor signal before the data update cycle may be defined as a mean value thereof during a predetermined previous data update period or as a gyro sensor signal obtained in an immediately preceding data update cycle. Alternatively, provided that the antenna unit 1 of the GPS receiver 2 includes a plurality of GPS antennas, the gyro sensor threshold value may be defined based on the moving body's angular velocity calculated from the rate of change in the direction of a baseline vector formed by the plurality of GPS antennas obtained from the GPS receiver 2.

Figure 3:
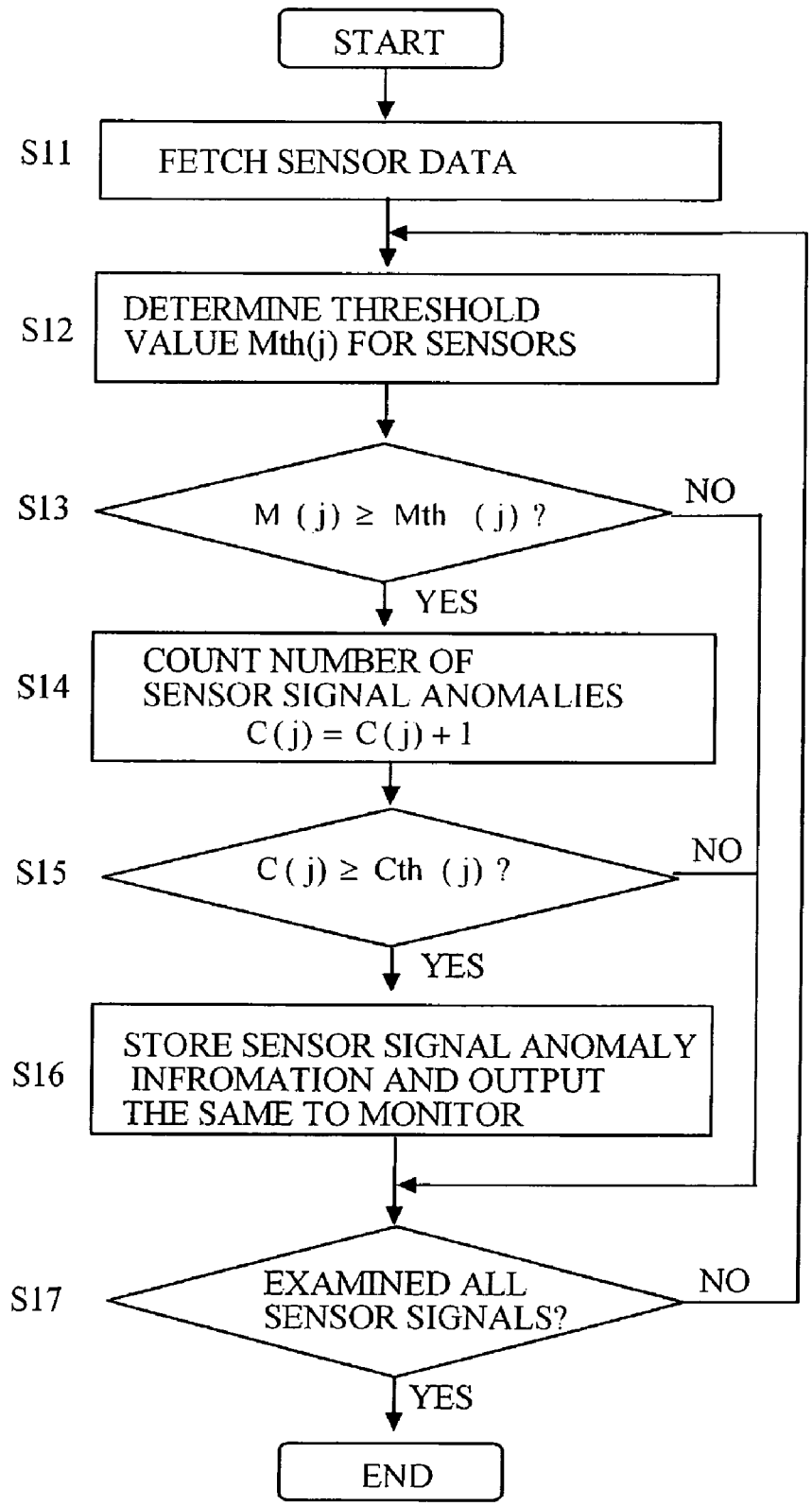
FIG. 3 is a flowchart showing a sequence of processing steps carried out by a sensor anomaly detector of the embodiment of the invention.

FIG. 3 is a flowchart showing a sequence of processing steps carried out by the sensor anomaly detector 6 of the present embodiment of the invention. It is to be noted that while the operating sequence of the sensor anomaly detector 6 is described herein on the assumption that the inertial sensor unit 4 includes a plurality of acceleration sensors and gyro sensors, the present invention is applicable to a GPS-Based ADS provided with one or more acceleration sensors only or one or more gyro sensors only, and not a combination of both and regardless of the number of sensors.

First, the sensor anomaly detector 6 fetches such data as values of inertial sensor signals, sensor numbers, acceleration sensor threshold values and gyro sensor threshold values in step S11. If necessary, the sensor anomaly detector 6 also fetches data required for determining the acceleration sensor threshold values as well as the gyro sensor threshold values and data required for counting the number of occurrences of anomalies (such as the number of GPS satellites used for navigation solution and the velocity and turn rate of the moving body) in this step.

Next, in step S12, the sensor anomaly detector 6 determines the acceleration sensor and gyro sensor threshold values Mth(j), where "j" represents the sensor number. Should there exist a plurality of acceleration sensors, the sensor anomaly detector 6 may determine the acceleration sensor threshold values for the individual acceleration sensors or a common acceleration sensor threshold value for all the acceleration sensors. Similarly, should there exist a plurality of gyro sensors, the sensor anomaly detector 6 may determine the gyro sensor threshold values for the individual gyro sensors or a common gyro sensor threshold value for all the gyro sensors.

Proceeding to step S13, the sensor anomaly detector 6 compares the inertial sensor signal M(j) of one inertial sensor having the sensor number j with the threshold value Mth(j) of the inertial sensor to detect the occurrence of an inertial sensor signal anomaly. If M(j)≧Mth(i) (Yes in step S13), the sensor anomaly detector 6 proceeds to step S14. The sensor anomaly detector 6 otherwise proceeds to step S17. In one variation of the embodiment, the operating sequence of FIG. 3 may be such that the sensor anomaly detector 6 proceeds to step S16 without going through steps S14 and S15.

In succeeding step S14, the sensor anomaly detector 6 counts the number of occurrences of anomalies of the inertial sensor having the sensor number j by using a sensor signal anomaly counter. In one form of the embodiment, the sensor signal anomaly counter may be controlled to increment a count value C(j) of signal anomalies of the inertial sensor having the sensor number j depending on at least one of such conditions as the number of GPS satellites used for navigation solution, the velocity of the moving body and the turn rate thereof. For example, the sensor signal anomaly counter may be controlled to increment the count value C(j) of inertial sensor signal anomalies only when the number of currently tracked GPS signals is smaller than the minimum number of GPS satellites required for navigation solution. Alternatively, the sensor signal anomaly counter may be controlled to increment the count value C(j) of inertial sensor signal anomalies only when at least one of the velocity of the moving body and the turn rate thereof does not exceed a measuring range of the pertinent sensor.

In a case where the inertial sensor unit 4 includes a plurality of acceleration sensors, the sensor anomaly detector 6 may use a single sensor signal anomaly counter to produce a single count value of signal anomalies of all the acceleration sensors or multiple sensor signal anomaly counters to produce count values C(j) of signal anomalies of the individual acceleration sensors. Similarly, when the inertial sensor unit 4 includes a plurality of gyro sensors, the sensor anomaly detector 6 may use a single sensor signal anomaly counter to produce a single count value of signal anomalies of all the gyro sensors or multiple sensor signal anomaly counters to produce count values C(j) of signal anomalies of the individual gyro sensors. Also, when the inertial sensor unit 4 includes one or more acceleration sensors and one or more gyro sensors, the sensor anomaly detector 6 may use a single sensor signal anomaly counter to produce a single count value of signal anomalies of all the acceleration and gyro sensors.

Proceeding now to step S15 which is a portion for deciding whether to output sensor signal anomaly information concerning inertial sensor signal anomalies, the sensor anomaly detector 6 compares the count value C(j) of the sensor signal anomaly counter with a predetermined threshold value Cth(j). If C(j)≧Cth(j) (Yes in step S15), the sensor anomaly detector 6 proceeds to step S16 to output the count value C(j) of the sensor signal anomaly counter to the monitor 7. The sensor anomaly detector 6 otherwise proceeds to step S17.

In step S16, provided that M(j)≧Mth(i) in step S13 or C(j)≧Cth(j)) in step S15, the sensor anomaly detector 6 stores the sensor signal anomaly information concerning the inertial sensor signal anomalies and outputs this information to the monitor 7 for on-screen presentation. In succeeding step S17, the sensor anomaly detector 6 makes a check to see whether all of the inertial sensor signals have been examined. Should there exist any unexamined inertial sensor signals, the sensor anomaly detector 6 returns to step S12 and repeats the above-described steps S12 to S17 until examination of all the inertial sensor signals is completed.

Figure 4:
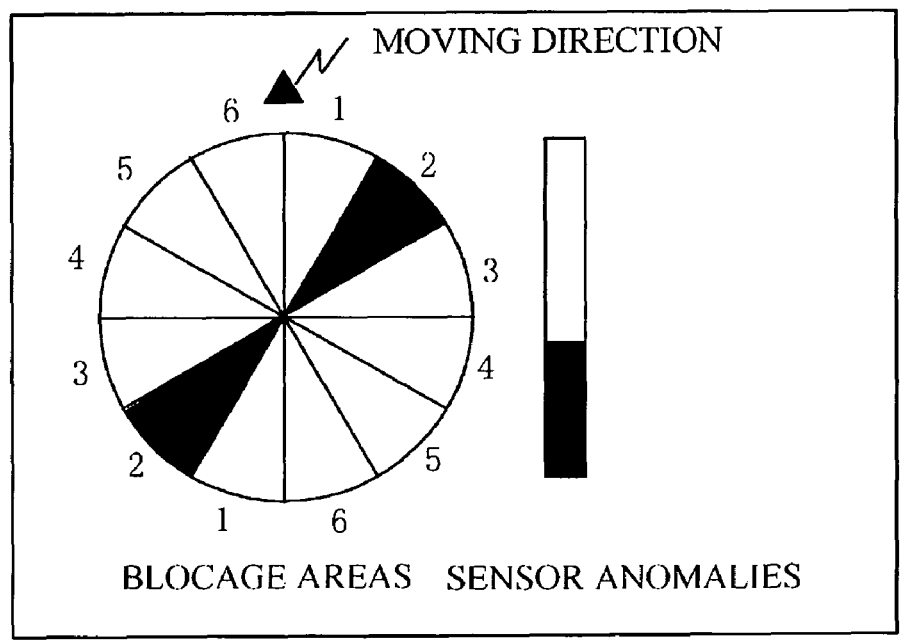
FIG. 4 is a diagram showing an example of on-screen presentation of information on GPS signal blockage and inertial sensor signal anomalies.
Figure 5:
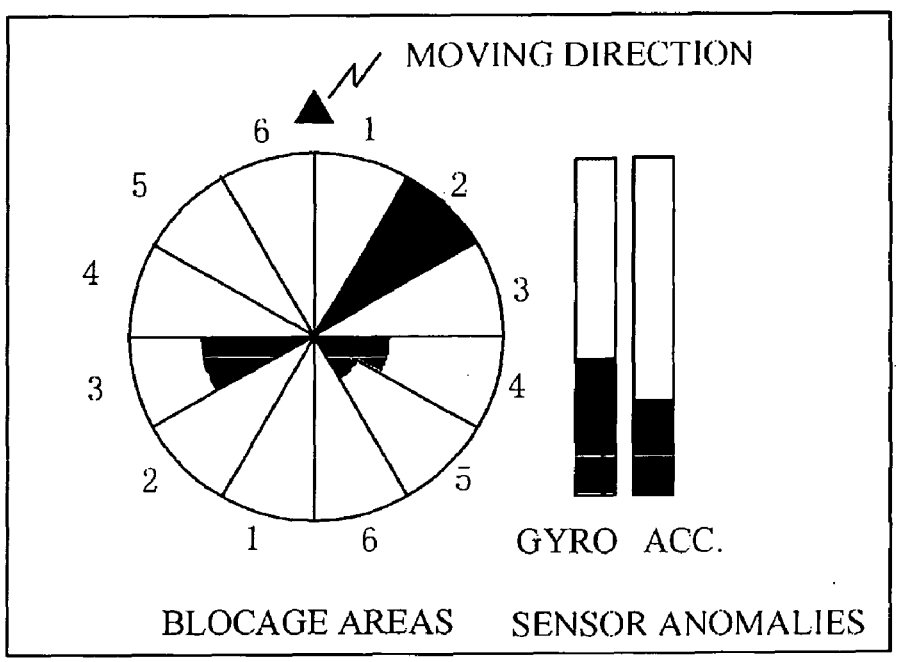
FIG. 5 is a diagram showing another example of on-screen presentation of the information on GPS signal blockage and inertial sensor signal anomalies.

Now, the working of the monitor 7 is described. The monitor 7 presents information useful for making a judgment on appropriateness of installation sites and mounting conditions of the antenna unit 1 and the inertial sensor unit 4 based on the blockage area information concerning each satellite signal blockage area obtained by the blockage area calculator 5 and the sensor signal anomaly information concerning each inertial sensor anomaly obtained by the sensor anomaly detector 6. FIGS. 4 and 5 are diagrams showing examples of on-screen presentation of information on GPS signal blockage and inertial sensor signal anomalies.

In the example of FIG. 4, the monitor 7 graphically shows an area in which GPS signals are most often blocked as well as the number of occurrences of anomalies of an inertial sensor (i.e., one of the acceleration and gyro sensors) which most often produces sensor signal anomalies. As depicted in FIG. 4, a full circle in the x-y plane of the body frame is divided into 12 equal sector areas among which a shaded sector area denoted by the letter "O" is the GPS signal blockage area in which the GPS signals are most often blocked. Sometimes, an obstacle located in a direction opposite to the GPS signal blockage area "O" may be produced multipath disturbance from a GPS satellite located in a direction to the GPS signal blockage area "O". Thus, the GPS-Based ADS of the present embodiment shows another sector area denoted by the letter "M" on the monitor 7 as an area in which the multipath disturbance is likely to occur as illustrated in FIG. 4. A gray portion of a bar graph shown at right in FIG. 4 represents the number of occurrences of anomalies of the inertial sensor which most often produces sensor signal anomalies.

In the example of FIG. 5, the monitor 7 graphically shows individual GPS signal blockage areas in which the GPS signals are blocked as well as the number of occurrences of anomalies of each inertial sensor (i.e., each of the acceleration and gyro sensors). In a case where the inertial sensor unit 4 includes a plurality of acceleration sensors and gyro sensors, the monitor 7 presents bar graphs separately showing the numbers of occurrences of anomalies of each acceleration sensor and gyro sensor.

Figure 6:
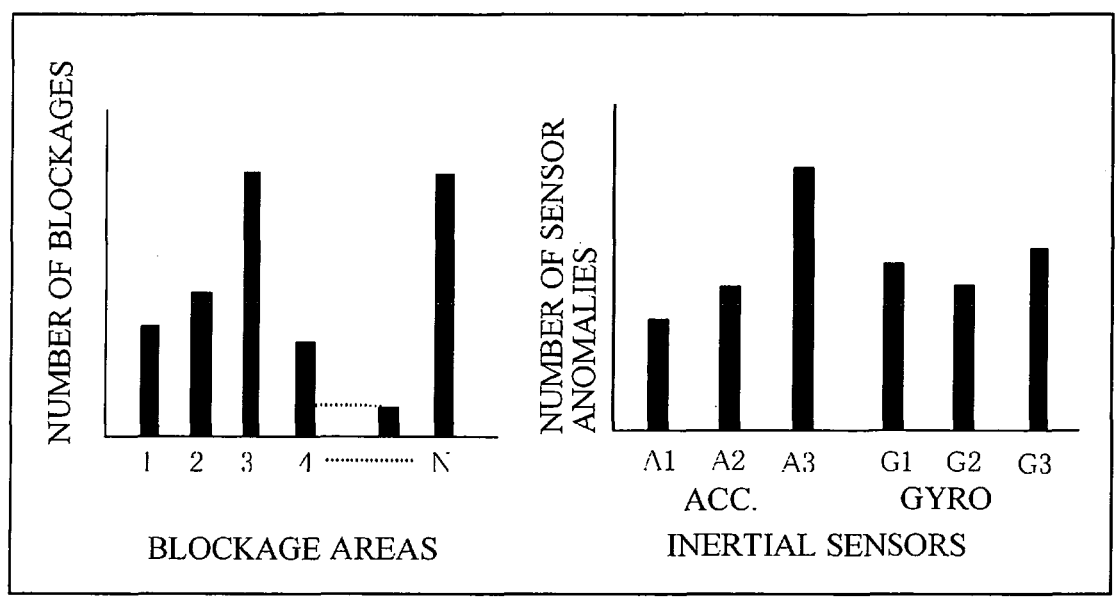
FIG. 6 is a diagram showing still another example of on-screen presentation of the information on GPS signal blockage and inertial sensor signal anomalies.

The monitor 7 may also present the accumulated numbers of occurrences of GPS signal blockage in predefined sector areas and the accumulated numbers of occurrences of anomalies of the individual inertial sensors as shown in FIG. 6, for example, based on continually updated information on the GPS signal blockage and information on the inertial sensor signal anomalies. Additionally, the monitor 7 may present a table showing judgment result concerning appropriateness of the installation sites and mounting conditions of the antenna unit 1 and the inertial sensor unit 4 derived from the information on the GPS signal blockage and the information on the inertial sensor signal anomalies which are stored and updated each time the GPS signal blockage or inertial sensor signal anomaly occurs.

Presentation of the information to be used for making a judgment on appropriateness of the installation sites and mounting conditions of the antenna unit 1 and the inertial sensor unit 4 is not particularly limited to the examples of FIG. 4, 5 or 6. The information used for judging the appropriateness of the installation sites and mounting conditions of the antenna unit 1 and the inertial sensor unit 4 may be presented in any convenient way. For example, the information presented to a user (or an installer) may include not only the GPS signal blockage areas and the number of occurrences of inertial sensor signal anomalies shown in FIGS. 4, 5 and 6 but also other kinds of information concerning the GPS signal blockage areas and inertial sensor signal anomalies. Furthermore, the information to be used for making a judgment on appropriateness of the installation sites and mounting conditions of the antenna unit 1 and the inertial sensor unit 4 may be presented in the form of a voice message, a graphic or tabular representation, a text message, or a combination thereof. Moreover, the information to be used for making a judgment on appropriateness of the installation sites and mounting conditions of the antenna unit 1 and the inertial sensor unit 4 may include a presentation of at least the GPS signal blockage areas or the occurrences of inertial sensor signal anomalies that occurred during a specific period of time in the past.

A user (or an installer) would judge whether the problem is caused by the inappropriate installation site or mounting conditions or by a failure of the GPS-Based ADS itself, using the information presented to a user (or an installer).

What is claimed is:

1. A GPS-based attitude determination system (GPS-based ADS) for determining attitude and heading of a moving body by integrated use of the Global Positioning System(GPS) and an inertial navigation system, said GPS-Based ADS comprising:
a GPS receiver for receiving GPS signals;
an inertial sensor for determining at least one of angular velocity and acceleration of the moving body;
an integration filter for producing a navigation solution by integrating an output of said GPS receiver and an output of said inertial sensor;
a blockage area calculator for defining a GPS signal blockage area in which any GPS signal is lost based on the output of said GPS receiver;
a sensor anomaly detector for detecting an anomaly of an inertial sensor signal fed from said inertial sensor; and
a monitor for presenting information to be used for identifying a cause of an operational failure of said GPS-Based ADS based on information obtained from said blockage area calculator and said sensor anomaly detector.

2. The GPS-Based ADS according to claim 1, wherein said blockage area calculator converts the direction of a GPS satellite of which GPS signal is blocked in a local geodetic frame or the ECEF frame into a direction projected onto a horizontal plane of a body frame referenced to the moving body, and said blockage area calculator defines the GPS signal blockage area as the direction of the blocked GPS satellite in the body frame.

3. The GPS-Based ADS according to claim 1, wherein said blockage area calculator converts the direction of a GPS satellite of which GPS signal is blocked in a local geodetic frame or the ECEF frame into a direction projected onto a horizontal plane of a body frame referenced to the moving body, and said blockage area calculator defines the GPS signal blockage area as an area having a predetermined sector angle oriented in the direction of the blocked GPS satellite in the body frame.

4. The GPS-Based ADS according to claim 1, wherein said blockage area calculator converts the direction of a GPS satellite of which GPS signal is blocked in a local geodetic frame or the ECEF frame into a direction in a body frame referenced to the moving body, and said blockage area calculator defines the GPS signal blockage area as the direction of the blocked GPS satellite in the body frame.

5. The GPS-Based ADS according to claim 1, wherein said blockage area calculator converts the direction of a GPS satellite of which GPS signal is blocked in a local geodetic frame or the ECEF frame into a direction in a body frame referenced to the moving body, and said blockage area calculator defines the GPS signal blockage area as a three-dimensional zone having a predetermined solid angle oriented in the direction of the blocked GPS satellite in the body frame.

6. The GPS-Based ADS according to claim 1, wherein said blockage area calculator defines the GPS signal blockage area as one of areas obtained by dividing a full circle in a horizontal plane of a body frame referenced to the moving body, each of the divided areas having a specified sector angle.

7. The GPS-Based ADS according to claim 1, wherein said blockage area calculator generates and stores blockage area information concerning the GPS signal blockage area when the GPS signal blockage occurs in a particular area.

8. The GPS-Based ADS according to claim 7, wherein the blockage area information includes at least the number of occurrences of the GPS signal blockage and the identification number of the blocked GPS satellite in addition to the presence of the GPS signal blockage area.

9. The GPS-Based ADS according to claim 8, wherein said number of occurrences of the GPS signal blockage is incremented only when the number of currently tracked GPS signals is smaller than a minimum number of GPS satellites required for navigation solution.

10. The GPS-Based ADS according to claim 1, wherein said blockage area calculator generates and stores blockage area information concerning the GPS signal blockage area when the number of occurrences of the GPS signal blockage in a particular area exceeds a predetermined threshold value.

11. The GPS-Based ADS according to claim 10, wherein the blockage area information includes at least the number of occurrences of the GPS signal blockage and the identification number of the blocked GPS satellite in addition to the presence of the GPS signal blockage area.

12. The GPS-Based ADS according to claim 10, wherein said number of occurrences of the GPS signal blockage is incremented only when the number of currently tracked GPS signals is smaller than a minimum number of GPS satellites required for navigation solution.

13. The GPS-Based ADS according to claim 1, wherein said sensor anomaly detector generates and stores sensor signal anomaly information when any inertial sensor signal anomaly occurs.

14. The GPS-Based ADS according to claim 13, wherein the sensor signal anomaly information includes at least the number of occurrences of inertial sensor signal anomalies, the identification number of the inertial sensor and an abnormal signal value output there from in addition to the occurrences of the inertial sensor signal anomalies.

15. The GPS-Based ADS according to claim 14, wherein said number of occurrences of inertial sensor signal anomalies is incremented based on at least one of such conditions as the number of currently tracked GPS signals is smaller than a minimum number of GPS satellites required for navigation solution, the velocity of the moving body, and the turn rate thereof.

16. The GPS-Based ADS according to claim 1, wherein said sensor anomaly detector generates and stores sensor signal anomaly information when the number of occurrences of inertial sensor signal anomalies exceeds a predetermined threshold value.

17. The GPS-Based ADS according to claim 16, wherein said number of occurrences of inertial sensor signal anomalies is incremented based on at least one of such conditions as the number of currently tracked GPS signals is smaller than a minimum number of GPS satellites required for navigation solution, the velocity of the moving body, and the turn rate thereof.

18. The GPS-Based ADS according to claim 1, wherein said monitor generates information to be presented and used for making a judgment on appropriateness of installation sites and mounting conditions of said GPS receiver and said inertial sensor based at least on blockage area information and sensor signal anomaly information obtained from said blockage area calculator and said sensor anomaly detector, respectively.

19. The GPS-Based ADS according to claim 18, wherein the information presented by said monitor includes at least one of a voice message, a graphic representation, a tabular representation, and a text message.

20. The GPS-Based ADS according to claim 18, wherein when a plurality of GPS signal blockage areas exist, said monitor presents information on only one of the GPS signal blockage areas in which GPS signal blockage has most often occurred.

21. The GPS-Based ADS according to claim 18, wherein when a plurality of GPS signal blockage areas exist, said monitor presents information on all of the GPS signal blockage areas in which GPS signal blockage has occurred.

22. The GPS-Based ADS according to claim 18, wherein said GPS-Based ADS comprises a plurality of inertial sensors, and said monitor presents information on only one of said inertial sensors which has most often produced sensor signal anomalies.

23. The GPS-Based ADS according to claim 18, wherein said GPS-Based ADS comprises a plurality of inertial sensors, and said monitor presents information on all of said inertial sensors which have produced sensor signal anomalies.

* * * * *